Dec. 11, 1962 G. F. PAULUS ET AL 3,068,186
WATER COLLOID PAINT CONTAINING HIGH PERCENTAGE OF FILLER
AND VINYL RESIN SOLIDS, AND METHOD FOR PREPARING SAME
Filed Sept. 3, 1958 2 Sheets-Sheet 1

INVENTORS
GEORGE F. PAULUS
EDWARD C. SCHOLL
BY
William T. Wise
AGENT

Dec. 11, 1962   G. F. PAULUS ET AL   3,068,186
WATER COLLOID PAINT CONTAINING HIGH PERCENTAGE OF FILLER
AND VINYL RESIN SOLIDS, AND METHOD FOR PREPARING SAME
Filed Sept. 3, 1958   2 Sheets-Sheet 2

INVENTORS
GEORGE F. PAULUS
EDWARD C. SCHOLL

BY

William T. Wise
AGENT

3,068,186
WATER COLLOID PAINT CONTAINING HIGH PERCENTAGE OF FILLER AND VINYL RESIN SOLIDS, AND METHOD FOR PREPARING SAME
George F. Paulus, West Orange, and Edward C. Scholl, Ramsey, N.J., assignors to Congoleum-Nairn Inc., Kearny, N.J., a corporation of New York
Filed Sept. 3, 1958, Ser. No. 758,754
11 Claims. (Cl. 260—29.6)

This invention relates to a paint composition and in particular to a coating paint having a high solids content useful in the production of printed surface coverings and to a method of producing such a coating paint and apparatus useful in such production.

Printed surface coverings having a decorative and wear resisting composition layer bonded to a backing are well known and find wide application as coverings for floors, walls, and the like. These printed surface coverings are in general of two main types. The first of these has a relatively thick surface layer of printed composition in the form of a decorative design wherein the printed layer is directly subjected to wear after the product is installed. Such products are conventionally produced on flat bed printing machines and the decorative composition can be either an oleoresinous enamel or a synthetic resinous material such as a vinyl resin. The second type of printed surface covering is more recent in origin and comprises an extremely thin printed design layer which is protected by a clear uniform layer of wear resisting composition. This second type of printed surface covering is conventionally produced by means of high speed rotogravure printing wherein a printing ink is applied in the form of closely spaced dots conforming to the desired design. After printing a clear layer of wear resisting composition such as a plastisol or organosol of a vinyl resin is applied to the printed design layer.

The backing material upon which the printed design is formed in either of the types of printed surface coverings described above is most commonly a sheet of felted cellulose fibers which has been strengthened by impregnation. Although there are many materials of both natural and synthetic origin which can be used as impregnants, bituminous materials such as asphalt are most commonly used because of their very low cost. Besides being low in cost, asphalt can impart to the finished product satisfactory strength and flexibility. A serious problem is created in the use of asphalt as a felt impregnant in the production of printed surface coverings, by virtue of the relatively low softening point temperature of asphalt. In the production of printed surface coverings by either of the techniques described above, the product is subjected to heat in order to fuse the printed composition layer or the clear layer of wear resisting composition to yield a tough, strong film. Where synthetic vinyl resinous compositions are used for either the printing composition in the case of production of a printed surface covering by the flat bed printing technique or as the composition for the clear layer in the production of printed surface coverings by the rotogravure technique, the vinyl resinous composition must frequently attain a temperature as high as 375° F. in order to cause fusion of the vinyl resin. At these temperatures asphalt becomes a thin watery liquid and tends to migrate from the impregnated felt back. It is essential, therefore, in the production of printed surface coverings, that the asphalt impregnated backing bear one or more seal coats which are interposed between the printed design layer and the backing in order to prevent any migration of the asphalt which would result in discoloration of the printed design.

The surface of a felted fibrous sheet is relatively rough in nature and tends to have a number of protruding lengths of fibers extending therefrom. The seal coats in addition to preventing the migration of the asphalt impregnant also serve to hide any irregularities in the felt and to form a smooth printing surface for the decorative design. In order that the seal coats have maximum hiding power for any irregularities in the surface of the felt, it is desirable that the seal coat compositions be formulated having a high proportion of filler solids and that the coating composition have a small percentage of water. In addition, the high solids content is desirable to insure that the coating paint have satisfactory viscosity conditions for application to the felt by any of the conventional techniques of coating such as doctoring or reverse roller coating. It is possible to attain the proper viscosity conditions by the use of thickeners such as casein but this in general is not desirable. Casein and other thickeners show poor water sensitivity and also their use complicates the formulation of seal coating paints by magnifying the evolution of foam during mixing.

There are two general methods for producing a seal coating paint composition. The first of these is to form an aqueous dispersion of filler and then to add this dispersion to an emulsion of the resinous binder to be used in the coating paint. The second method is to add the filler in solid form directly to the emulsion of resinous binder. This latter method is obviously preferably where it is desired to produce a coating paint of the highest possible solids content since no additional water or other dispersion medium is added with the filler.

The direct addition of solid filler to a resinous emulsion presents certain difficulties. A considerable quantity of air is entrapped between the individual filler particles which escapes beneath the mass of the emulsion during the mixing causing the evolution of foam. The air liberated from the filler is augmented by the air forced into the emulsion during the mixing operation. The conventional types of mixers used in mixing paints such as roller mills, pebble mills and turbine mixers are high shear mixers and tend to introduce large amounts of air into the material being mixed. Where an additional source of air is from the ingredients themselves, excessive foaming results. The finished paint must be allowed to stand for a long period of time to permit the foam to become dissipated. In the production of printed surface coverings by the rotogravure technique, a felt sheet up to 12 feet in width is frequently printed at speeds in excess of 100 feet per minute. Large volumes of seal coating paints are required to provide coated felt at a rate to sustain such high printing speeds. Thus, if it becomes necessary to allow the coating paints to stand for long periods of time to permit dissipation of foam, it is apparent that additional plant investment in storage facilities will be required. Also, prolonged standing increases the possibility of contamination of the coating paints from foreign matter.

A further disadvantage of the mixing methods of the prior art is the relatively large power requirements. Pebble mills can require as high as 30 horsepower motor drives for mixing a 500 gallon batch of paint and roller mills require corresponding large drives for comparable throughputs. This is expensive from the standpoint of investment and energy requirements and also the high energy input to the paint causes heat build-up which can result in premature coagulation of the emulsion.

The high degree of mechanical shear created by conventional mixers used in the prior art precludes the use of resinous binder emulsions which are excessively unstable toward mechanical shear. Polymers and copolymers of vinylidene chloride are examples of resinous materials which yield emulsions which are highly unstable toward mechanical shear. Such polymers and copolymers have excellent sealing properties against the migration of asphalt, and thus are particularly effective for use in the formulation of seal coating paints useful in the manufacture of printed surface coverings. When solid filler is directly added to an unstable resinous binder emulsion, such as an emulsion of vinylidene chloride polymer, using the conventional methods of agitation of the prior art, the emulsion coagulates before a uniform dispersion of the filler can occur. Thus, it has been necessary when formulating a coating paint based on these unstable resinous binder emulsions to form an initial aqueous dispersion of the solid filler and then to add this dispersion to the resinous binder emulsion. Since considerable water is added associated with the filler in the dispersion, a coating paint of the desired high solids content based on mechanically unstable resinous binders has not been obtainable using the mixing procedures of the prior art.

It is an object of the invention to provide a method of producing a high solids content coating paint where foaming is minimized during the mixing of the paint.

It is another object of the invention to produce a coating paint having a high solids content which has excellent properties for sealing asphalt and the ability to cover irregularities in the surface of a felted fibrous sheet.

It is a further object of the invention to provide a method of mixing large volumes of coating paints at modest power requirements with a minimum amount of heat build-up in the paint during the mixing operation.

Other objects and the advantages of the invention will appear hereinafter.

In accordance with the invention a high solids content resinous emulsion coating paint is produced by the uniform addition of solid fillers over a period of time to an emulsion of a resinous binder in a mixing tank while the contents are displaced from the upper surface toward the bottom of the tank in the form of a cylinder of material revolving about an axis, the location of the cylinder with respect to the geometry of the tank being critical. It has been found possible to produce coating paints containing resinous binders which are unstable toward mechanical shear at a higher level of solids content than previously obtainable. Power requirements, heat build-up in the paint and foaming are minimized during mixing.

The method of the invention is adaptable to the preparation of coating paints which comprises resinous binder and filler emulsified in a liquid medium which is most commonly water. The resinous binder is most commonly a vinyl resinous material which can, if desired, be mixed with a compatible plasticizer for the resin. A vinyl resin is broadly characterized as being a polymeric material produced by polymerizing materials which contain one or more vinyl groups, that is, the —HC=C group. Coating paints comprising a vinyl resinous binder are particularly desirable as seal coats in the preparation of printed surface coverings having a clear vinyl resinous wear layer since thereby the maximum degree of compatibility is obtained between the seal coat and wear layer compositions. This promotes a high degree of adhesion between the coatings and the wear layer. Suitable vinyl resins include polymerized vinyl chloride, polymerized vinylidene chloride, polymerized vinyl ester of a carboxylic acid having from 2 to 4 carbon atoms such as vinyl acetate, vinyl propionate, vinyl butyrate and the like, polymerized acrylic acid, polymerized methylacrylic acid and the like and polymerized derivatives of these acids such as ethyl acrylate, methyl methacrylate, butyl acrylate and the like, mixtures of these materials with each other and copolymers of these materials with each other as well as copolymers with other monomers copolymerizable therewith such as maleic acid, acrylonitrile, chloromaleic acid and the like. Such copolymers as those of vinyl chloride-vinyl acetate, vinyl chloride-vinylidene chloride, vinyl chloride-methyl methacrylate, methyl methacrylate-ethyl acrylate, ethyl acrylate-vinyl acetate and the like are useful. The vinyl resin selected should preferably have good sealing properties against the migration of asphalt and thus should be a resin which is incompatible with asphalt. Polymers of vinylidene chloride, the term polymers embracing both homopolymers and copolymers and particularly copolymers of vinylidene chloride with vinyl chloride containing 50 to 70 percent vinylidene chloride by weight have this characteristic to a high degree and are therefore particularly effective vinyl resins in the production of coating paints in accordance with the invention.

The vinyl resin can be mixed with a compatible plasticizer or extender to form the resinous binder of a coating paint in accordance with the invention. Such conventional plasticizers as tricresyl phosphate, dioctyl phthalate, dipropylene glycol dibenzoate, dioctyl sebacate, high boiling condensates formed in the distillation of petroleum, coal tar and natural resinous fractions and the like can be used as well as polymeric materials such as butadiene-styrene copolymer, butadiene-acrylonitrile copolymer and the like. Where a plasticizer is used it preferably should be one which lacks affinity for asphalt. Butadiene-styrene copolymer is such a material and thus is a particularly effective plasticizer. Whether a plasticizer is used depends on the particular properties of the vinyl resin. Certain vinyl resins have the property of forming tough flexible films without the presence of any plasticizer. On the other hand, with certain of the harder resinous materials such as polyvinyl chloride, a plasticizer is normally required in order to produce the desired film strength. With some vinyl resins the use of a plasticizer is optional.

Although the method of the invention is adapted to production of coating paints having a high solids content comprising a wide range of resinous binders as disclosed hereinabove, its particular utility lies in the production of coating paints comprising resinous binders which are unstable towards mechanical shear. Paints comprising such binders can be produced in accordance with the invention at a solids content which is unattainable by any of the methods of the prior art.

The stability of a particular resinous binder can be measured and defined by the following empirical stability test:

The following ingredients are added to a standard one quart paint can:

285 grams of an emulsion of the resinous binder, the stability of which is to be determined;
36 grams of a 6 percent solids solution of tetrasodium pyrophosphate;
3.3 grams lecithin pigment dispersant;
1.3 grams of anti-foam agent;
563 grams of finely divided filler.

These ingredients are blended for 20 minutes using a propeller driven agitator bearing two 1½ inch propellers spaced one inch apart driven by $\frac{1}{60}$ horse power motor and operated at a speed of 2400 r.p.m. The agitator shaft is inserted at an angle into the paint can and the position adjusted to the point of minimum vortex.

After the 20 minute initial mixing period, a 15 percent solids casein suspension is added in an amount sufficient to give a flow of 8 plus or minus 1 centimeter in 10 seconds as measured in the following way: 2.5 cubic centimeters of composition is released down a grooved incline having a groove which is one centimeter wide, the incline making an angle of 30° with the horizontal. The distance which the leading edge travels in 10 seconds is noted. This is defined as the flow of the paint.

When the proper flow is attained, the agitator is then operated at 2400 r.p.m. and timing is started. When the contents in the paint can become so thick that the paint will not drop off a spatula, the timing is stopped and this is taken as the end point. The sudden thickening of the paint composition indicates coagulation of the resinous binder emulsion and normally occurs over a very short period of time. Thus a sharp end point can be determined by this test procedure. The measured time determined by this test defines the stability value of the particular resinous binder. The term stability value as used in the specification and the claims indicates the results of a stability test carried out in accordance with the procedure described hereinabove.

It has been found that coating paints based, for example, on a butadiene-styrene copolymer latex can withstand mechanical shear in the above described test for a period in excess of 5 hours. Such a long time indicates the presence of a stable resinous binder and coating paints can be formulated with a high solids content using any of the conventional mixing procedures of the prior art. On the other hand, where all or a portion of the resinous binder comprises a mechanically unstable resinous binder, initial signs of coagulation can frequently be observed in as short a time as ½ of an hour. The method of the invention is particularly useful for the preparation of high solids content coating paints where the resinous binder shows a stability value of from ¾ to 3 hours. Polymers of vinylidene chloride are examples of mechanically unstable resinous binders. Thus, the method of the invention is particularly adaptable to the preparation of coating paints comprising as the resinous binder a polymer of vinylidene chloride with a high solids content in the finished paint. This is particularly desirable since polymers of vinylidene chloride exhibit the ability to prevent the migration of asphalt from a sheet of asphalt saturated felt to a high degree and thus are particularly effective resinous binders in seal coating paint compositions useful in the manufacture of printed surface coverings.

In the production of coating paints in accordance with the invention solid filler is dispersed in an emulsion of resinous binder. Prior to the addition of the filler to the binder emulsion, it is normally desirable to add such materials as wetting agents, anti-foam agents, and sequestering agents in order to promote dispersion of the solid filler particles. When solid filler is dispersed in water to form an aqueous filler dispersion these other ingredients are normally present in the filler dispersion. In accordance with the invention the filler particles are added directly to the resinous binder emulsion. Thus, these added ingredients should be present in the emulsion in order to promote dispersion in the filler therein. Suitable wetting agents include the sodium salt of alkyl aryl sulfonic acid, potassium oleate, resin acid soap, alkyl aryl polyether sulfonate and the like. Examples of suitable anti-foam agents include pine oil, octyl alcohol, diglycol laurate and any of the various silicone anti-foam agents such as those manufactured by the Dow-Corning Co., Midland, Michigan. The most common sequestering agent used is tetrasodium pyrophosphate but other sequestering agents commonly used in the paint industry can be used if desired. These ingredients are added to the resinous binder emulsion prior to the addition of solid filler and are used in the quantities normally used in the paint industry to promote the dispersion of solid filler in water.

Coating paints produced in accordance with the invention comprise a high proportion of solid filler. The term filler as used in the specification and claims includes such pigments and inert materials as barium sulfate, magnesium carbonate, silica, whiting, talc, clay, pumice, limestone and the like. Coating paints must have a high proportion of filler solids in order to have good ability to cover irregularities in a felt sheet. In addition the high level of filler solids is desirable in reducing the cost of the coating paint. A ratio of filler to binder solids of about 1.5 to 1 to about 6 to 1 is desirable. A range of 2.5 to 1 to 4.5 to 1 is particularly effective.

As disclosed hereinabove, the method of the invention is adaptable to the production of emulsion coating paints comprising as the resinous binder any of a wide class of vinyl resins. However, it finds particular utility in the production of coating paints which have a resinous binder comprising a mechanically unstable resin, particularly one showing a stability value of ¾ to 3 hours. Heretofore, a coating paint comprising such a resin has been produced only by addition of an aqueous dispersion of filler to an emulsion of resin. By this technique, water in incorporated into the paint composition not only associated with the resinous binder emulsion but also associated with the filler in the aqueous dispersion. In accordance with the invention a method has been found to add solid filler directly to an emulsion of even a mechanically unstable latex; thus, by this method, coating paints comprising a resin having a stability value of ¾ to 3 hours can be made at a solids content unobtainable by the techniques of the prior art.

In defining the solids content of the coating paint compositions comprising a mechanically unstable resin produced in accordance with the invention, it is necessary to consider the solids content of the resinous binder emulsion and also the maximum solids content of aqueous filler dispersions used in the prior art. When a mechanically unstable resin is formed as an emulsion, the degree of instability increases sharply as the solids content of the emulsion increases. It has been found that resinous binder emulsions which comprise a mechanically unstable resin can not exceed a solids content of about 50 percent resinous binder solids by weight for use in the manufacture of coating paints. Thus, for every pound of resinous binder solids present in the finished paint, a minimum amount of one pound of water will be associated therewith.

In the formulation of coating paints in accordance with the techniques of the prior art, filler is added to the resinous binder emulsion in the form of an aqueous dispersion. Certain aqueous filler dispersions can be obtained with a solids content up to 80 percent by weight with the balance being water. It is impossible to obtain an aqueous filler dispersion of higher solids content than 80 percent by weight. Above this level, the filler can not become completely wet and the mass becomes gummy and can not be handled. Thus, for every pound of filler added in accordance with the technique of the prior art a minimum of ¼ pound of water is added to the resinous binder emulsion representing water associated with the filler in the aqueous dispersion.

When a coating paint comprising a resinous binder having a stability value of ¾ to 3 hours has a water content less than that obtainable by using the techniques of the prior art, the paint composition can not be made except by the method of the invention. The water content of such a coating paint in accordance with the invention is from $x$ to $x+\frac{1}{4}y$, where $x$ is the weight of resinous binder solids and $y$ is the weight of filler solids. The minimum amount of water in a coating paint in accordance with the invention is equal to the amount of resinous binder solids (that is, $x$) and is present in the paint through use of a resinous binder emulsion of 50 percent resinous binder solids content, the maximum solids content obtainable with mechanically unstable resinous binders. Where the amount of water exceeds $x+\frac{1}{4}y$, this indicates the addition to a resinous binder emulsion of 50 percent solids content of an aqueous filler dispersion of 80 percent solids content of less, thereby indicating that the coating paint could be prepared by mixing techniques of the prior art.

The method of the invention will be described with reference to the drawing wherein FIGURE 1 is a side view in section of mixing apparatus useful in the production of coating paints in accordance with an embodiment of the invention;

Figure 1:
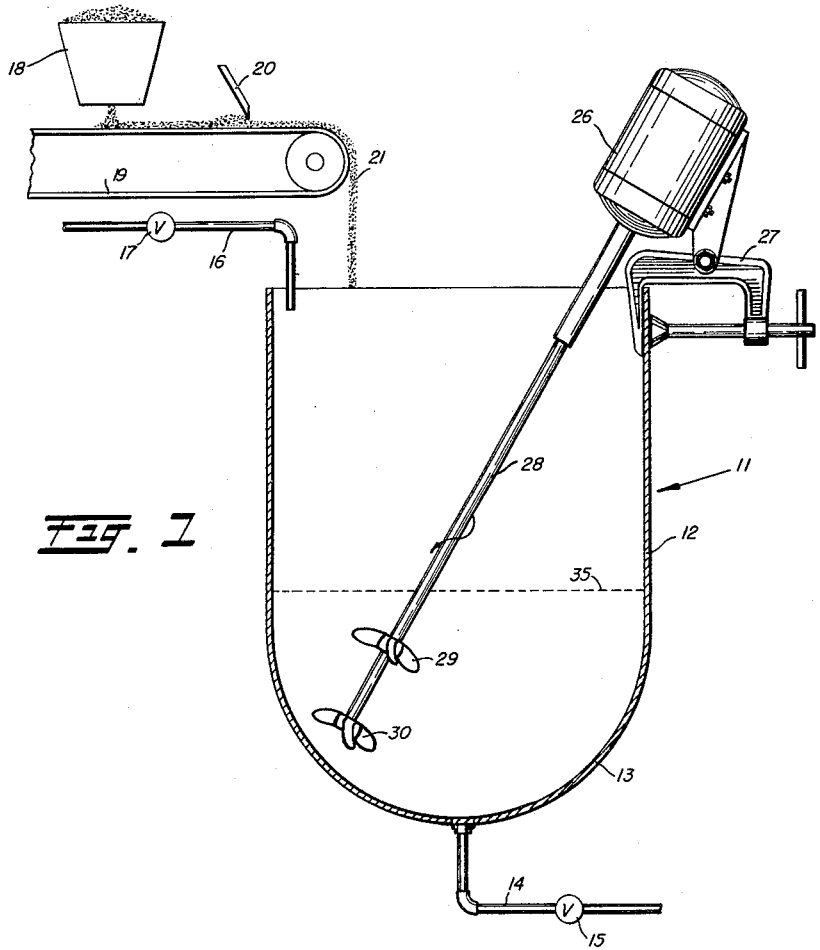
Figure 2:
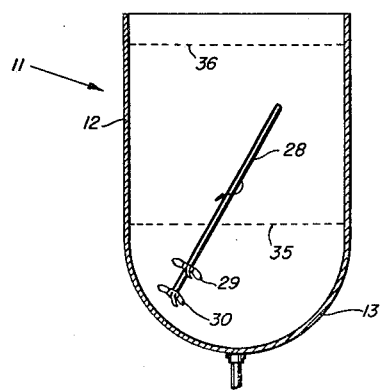
FIGURE 2 is a side view in section of the mixing apparatus shown in FIGURE 1 illustrating the liquid level in the mixing vessel after the mixing operation has been completed.
Figure 3:
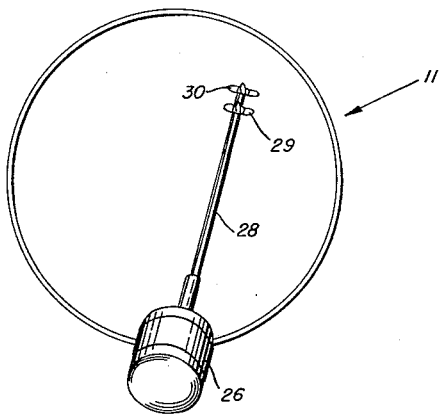
FIGURE 3 is a top view of the mixing apparatus shown in FIGURES 1 and 2.

With reference to the drawing a mixing tank 11 is constructed with an upper cylindrical section 12 joining a hemispherical bottom section 13. A discharge conduit 14 controlled by a valve 15 is provided at the bottom of the tank to facilitate removal of the contents thereof. A feed conduit 16 controlled by a valve 17 is provided to permit feeding liquid materials to the tank. A hopper 18 for storage of solid filler is arranged above a conveyor 19 provided with an oscillating doctor blade 20 to permit feeding of solid filler 21 to the tank. A mixing assembly is provided in the tank comprising a motor 26, a clamp 27 for fastening the assembly to the wall of the tank, a mixer shaft 28 and propeller mixing elements 29, 30. Liquid level 35 shown in FIGURE 1 illustrates the level after the addition of a resinous binder emulsion to the mixing tank. Liquid level 36 shown in FIGURE 2 illustrates the level of the finished coating paint after all the solids have been added and the mixing is completed.

Figure 4:
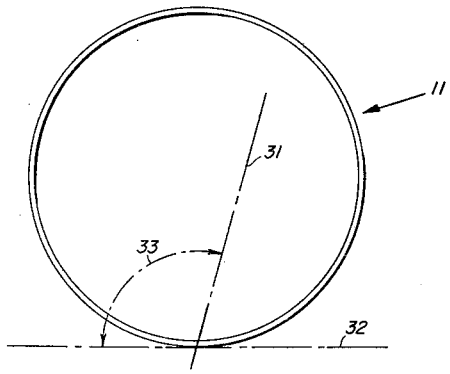
FIGURE 4 is a schematic diagram showing the relation between the agitator shaft and a tangent drawn at the point of contact of the agitator shaft with the wall of the mixing vessel in the apparatus shown in FIGURES 1, 2 and 3.

With reference to FIGURE 4 a line 31 represents the projection of the mixer shaft 28 onto a horizontal plane constructed to intersect the side walls of the tank. A horizontal tangent 32 is drawn at the point of intersection of the horizontal projection 31 with the wall of the mixing vessel. The horizontal projection makes an angle 33 with the horizontal tangent measuring from the tangent towards the horizontal projection in a clock-wise direction of revolution of the agitator shaft.

In operation, a resinous binder emulsion is delivered to the tank through the feed conduit 16. Power is then applied to the motor 26 causing the shaft and propeller mixing elements to rotate in a clock-wise direction. Small amounts of emulsifying agents, anti-foam agents, sequestering agents and the like are then added in liquid form to the resinous binder emulsion. Agitation is continued until thorough dispersion and mixing of these ingredients into the resinous binder emulsion is brought about. The solids feeding apparatus is then operated to deliver a uniform feed of solid filler to the mass of resinous binder emulsion in the tank. The solids addition continues until the desired concentration of filler in the composition is obtained. The agitator is operated throughout the period of solids addition. At the conclusion of the solids addition period a uniform coating paint dispersion has been produced with a high solids content. The agitator is then shut off and the coating paint is withdrawn from the tank through the discharge conduit 14.

The mixing tank in which the coating paint is prepared in accordance with the invention can be constructed in any convenient shape. However, it is desirable that the tank have a circular cross-section in order that the agitator action may be effective throughout the volume of the tank. It is preferred that the bottom of the tank slope towards a common point to facilitate removal of the entire coating paint batch after mixing is complete. The type of construction illustrated in the drawing is particularly effective, that is a cylindrical tank having a smooth dished bottom constructed as a hemisphere or other similar curved shape. Alternately, the bottom section can be constructed as flat intersecting sides which meet at a point where the discharge conduit is located. A flat horizontal bottom can also be used, but with this type of construction the tank is more difficult to completely drain. The size and capacity of the mixing tank will, of course, depend on the volume of the paint batch to be mixed. Desirable conditions of mixing are obtained when the ratio of the height of the tank to the diameter is from about 0.5:1 to 2:1 with a range of 1.0:1 to 1.5:1 being particularly effective.

The construction and location of the agitator is of particular importance in carrying out the invention. In accordance with the invention, it has been found that propeller type agitator elements can be used to mix coating paints if the agitator is placed within the tank in a critical manner. The agitator shaft comprises one or more propeller elements spaced along its length. Each propeller can bear two or more blades with three-bladed propellers being most common. The placement of the propeller elements along the shaft should be controlled so that all the elements are completely covered by the liquid mass in the tank during all stages of the mixing. This means that the propeller elements must be located in the bottom section of the tank since the resinous binder emulsion which is initially added to the tank fills only the bottom portion thereof. The propellers should be pitched so that each propeller directs the liquids in a downward direction towards the bottom surface of the tank.

The placement of the agitator elements within the tank is critical in the production of coating paints in accordance with the invention. First, the agitator shaft must enter the liquid mass tank at an angle with the surface of the liquid. Horizontally or vertically disposed agitator shafts can not be used in the production of coating paints in accordance with the invention. The agitator shaft should make an angle of about 25° to about 75° with the surface of the liquid in the tank with the range of 40 to 60° being particularly effective. The proper angle of entry of the agitator shaft can be most conveniently obtained by clamping the agitator assembly upon the upper edge of the mixing tank and directing the agitator shaft downward into the tank at the desired angle. Alternately, the agitator shaft can enter the mixing tank through the wall thereof at the proper angle.

It is essential that the agitator shaft extend into the mixing tank in a non-radial fashion in such a way that the linear projection of the shaft upon a horizontal plane constructed to intersect the sides of the tank makes a critical angle with a horizontal tangent drawn at the point of contact of the projection with the wall of the mixing tank. This critical angle is related in part to the direction of rotation of the agitator shaft. The angle made by the horizontal projection of the shaft with a horizontal tangent drawn at the point of contact of the projection with the cylindrical wall of the vessel should be from about 95° to about 140° measuring from the tangent towards the horizontal projection in a direction conforming to the direction of rotation of the shaft. Mixers are conventionally operated in a clockwise direction. Thus, the critical angle should be measured by moving from the horizontal tangent to the horizontal projection of the shaft in a clockwise direction. This is illustrated in FIGURE 4. Should the agitator for some reason be operated in a counter clockwise direction the measurement of the angle should also be done by moving counter clockwise from the tangent to the horizontal projection. It has been found that an angle of 100° to 120° between the horizontal projection and the horizontal tangent is particularly effective.

The location of the agitator elements in the mixing tank and the critical angles made by the agitator shaft as described hereinabove are necessary in order to carry out the invention. When the agitator is located in the manner described vortex effects which are frequently encountered with propeller type agitators are virtually eliminated. Any form of violent vortex is undesirable since such a vortex carries air beneath the surface of the liquid where it is then liberated. Such liberation of air beneath the surface of a resinous binder emulsion leads to the formation of foam which is highly undesirable. This is particularly true in producing cooating paints in accordance with the invention because appreciable quantities of air are introduced with the solid pigment particles. Thus, no additional introduction of air can be tolerated. In addition, it has been found that the critical placement of the agitator elements within the tank effects rapid and efficient mixing of the contents. Thus, the resinous binder emulsion is subjected to the minimum possible amount of mechanical shear, a factor which is of specific significance where mechanically unstable resins are used. If, for example, the mixer enters the tank in a vertical direction, not only is an undesirable vortex created leading to excessive foam, but the mixing action is not sufficiently efficient to prevent settling of the heavy filler particles in certain areas of the tank. Horizontal entry of the agitator shaft is also undesirable due to a less efficient mixing action. If the critical angle between the horizontal projection of the agitator shaft and the horizontal tangent is not maintained a violent vortex is created in the tank, thus leading to excessive foam.

The invention has been illustrated in the drawing with agitation effected by two propeller elements on a revolving shaft. A rotating propeller is ideally suited to the preparation of resinous emulsion coating paints having a high solids content in accordance with the invention since material is displaced from the upper surface of the contents of the mixing tank to strike the bottom of the tank and thereafter becomes distributed throughout the tank. With a propeller, the material in the tank is displaced from top to bottom in the form of a cylinder of material revolving about the shaft; this form of agitation has been found to be particularly suited to the production of coating paints. Other types of agitator elements than propellers can be used provided the displacement of material during the mixing is from the top to the bottom of the tank in the form of a revolving cylinder. Whatever specific type of agitator is used, the central axis of the revolving cylinder of displaced material must be related to the geometry of the tank as described hereinabove.

In accordance with the method of the invention the filler solids should be added slowly and uniformly to the resinous binder emulsion while continuously agitation is brought about by use of the mixing assembly as already described hereinabove. It is preferred that the rate of solids addition be controlled so that the filler is added at a constant rate over a period of about 30 to about 75 minutes. A range of 40 to 60 minutes is particularly effective.

After the solids have been added the contents of the mixing tank are examined to determine whether a satisfactory viscosity and flow condition has been obtained for coating purposes. Normally a small amount of additional thickening is required and at this point conventional thickening agents such as casein, methyl cellulose, carboxy methyl cellulose and the like can be added. It is, however, one of the features of coating paints produced in accordance with the invention that a large amount of casein is not required since the high level of filler solids results in imparting a considerable degree of body to the coating paint composition.

In addition to effecting mixing by means of the propeller agitator assembly located within the tank as described hereinabove, it is also possible to continuously circulate a portion of the contents of the tank through an external pump and reintroduce the mixture within the tank. This additional mixing insures that there will be no settling of solids in the bottom of the mixing tank. When the mixing tank has a smooth dished bottom section as illustrated in the drawing, this external circulation is normally not required.

In accordance with the invention, a method is available for mixing large batches of coating paints at low power requirements. For example, a 500 gallon batch of a coating paint can be mixed using a 5 horsepower motor by the method of the invention, in contrast to the mixing techniques of the prior art which would require drives of as high as 30 horsepower. Consequently, heat build-up in the contents of the mixing tank is held to a minimum by the method of the invention. In addition, the method of the invention is characterized by causing a minimum of foam evolution during the mixing operation. Thus, coating paints prepared by the method of the invention are ready for use promptly without requiring long periods of standing to allow foam to become dissipated. This is a particularly desirable result in the production of printed surface coverings where large volumes of seal coating paints are required. The outstanding attribute of the invention is that it affords a method of producing coating paints comprising mechanically unstable resinous binders at a level of solids content higher than heretofore obtainable.

The following example is given for purposes of illustrating the invention:

*Example*

The following resinous emulsions were added to a mixing tank:

| | Pounds |
|---|---|
| Vinylidene chloride-vinyl chloride copolymer latex (50% solids) | 1395 |
| Butadiene-styrene copolymer latex (50% solids) | 505 |
| | 1900 |

The mixing tank was 4.5 feet in diameter and had a total height of 5.5 feet. It was constructed with an upper cylindrical section having a height of 3.25 feet joined to a hemispherical bottom section. An agitator, driven by a 5 horsepower motor, was clamped to the upper edge of the tank. The shaft terminated in 2 3-bladed propellers, spaced 1.5 feet apart, pitched to direct liquid in a downward direction when the agitator was rotated in a clockwise direction. The shaft made an angle of 53° with the level of the emulsion in the tank and the horizontal projection of the shaft made an angle of 105° with a horizontal tangent drawn to the surface of the mixing tank at the point of contact of the horizontal projection with the wall of the tank, measuring in a clockwise direction from the tangent to the horizontal projection. Both propellers were completely covered by the emulsion in the tank.

The agitator motor was actuated, driving the shaft in a clockwise direction. The following materials were added:

| | Pounds |
|---|---|
| Lecithin (100% solids) | 22 |
| Tetrasodium pyrophosphate solution (6% solids) | 240 |
| Antifoam agent (100% solids) | 9 |
| | 271 |

After a uniform dispersion had been obtained, 3,750 pounds of finely divided calcium carbonate were added at a uniform rate of 80 pounds per minute, the agitator rotating constantly. The mixing proceeded smoothly with a minimum of foam evolution. At the conclusion of 50 minutes, after all solids had been added, 129 pounds of a 15 percent solution of casein were added.

The finished coating paint had a ratio of filler to binder solids of 4:1 and had a solids content of 78.7 percent.

The resinous binder system used showed a stability value according to the test described in the specification of 1.5 hours. By the mixing techniques of the prior art, such a mechanically unstable system could be formed into a coating paint only by adding an aqueous filler dispersion. If the filler dispersion had a solids content of 80 percent, the most concentrated obtainable, the final solids content of the coating paint would be 70.3 percent, appreciably lower than that obtained by the method of the invention as described in the example.

Any departure from the above description which conforms to the present invention is intended to be included within the scope of the claims.

We claim:

1. A method of producing a high solids aqueous paint comprising water having uniformly dispersed therein in a solid state filler and a vinyl resinous binder having a stability value of between ¾ and 3 hours, said filler being present in about 1.5 to about 6 parts per part of said binder and said water being present in an amount between $x$ and $x+¼y$ wherein $x$ is the weight of said binder and $y$ is the weight of said filler, which comprises slowly adding said filler to a dispersion of said binder in said water in a tank while continuously displacing the surface of the dispersion towards the bottom of said tank in the form of a cylinder of dispersion continuously revolving about an axis, said axis being inclined at an angle of about 25° to about 75° to the horizontal and a linear projection of said axis upon a horizontal plane makes an angle of about 95° to about 140° with a horizontal tangent drawn to the wall of said tank at the point of intersection of said projection with said wall, the latter angle being measured from said tangent to said projection in a direction of revolution of said cylinder and discontinuing said displacing after all of said filler has been uniformly dispersed in said dispersion.

2. The method according to claim 1 wherein said filler is added to said dispersion over a period of about 30 to about 70 minutes.

3. The method according to claim 1 wherein said axis is inclined at an angle of 40° to 60° to the horizontal and said projection makes an angle of 100° to 120° with said tangent.

4. The method according to claim 1 wherein said vinyl resinous binder contains a polymer of vinylidene chloride.

5. A method of producing a high solids aqueous paint comprising water having uniformly dispersed therein in a solid state filler and a copolymer of vinylidene chloride and vinyl chloride having a stability value of between ¾ and 3 hours and plasticizer for said copolymer as a binder, said filler being present in about 1.5 to about 6 parts per part of said binder and said water being present in an amount between $x$ and $x+¼y$ wherein $x$ is the weight of said binder and $y$ is the weight of said filler, which comprises slowly adding said filler to a dispersion of said binder in said water in a tank while continuously displacing the surface of said dispersion towards the bottom of said tank in the form of a cylinder of dispersion continuously revolving about an axis, said axis being inclined at an angle of about 25° to about 75° to the horizontal and a linear projection of said axis upon a horizontal plane makes an angle of about 95° to about 140° with a horizontal tangent drawn to the wall of said tank at the point of intersection of said projection with said wall, the latter angle being measured from said tangent to said projection in a direction of revolution of said cylinder and discontinuing said displacing after all of said filler has been uniformly dispersed in said dispersion.

6. A high solids aqueous paint composition useful in the production of printed surface coverings which comprises a uniform water dispersion of a solid vinyl resinous binder and solid filler, said resinous binder having a stability value of between ¾ and 3 hours, said filler being present in about 1.5 to about 6 parts per part of said binder and the amount of said water being between $x$ and $x+¼y$ wherein $x$ is the weight of said binder and $y$ is the weight of said filler.

7. The paint composition of claim 6 wherein said filler is present in about 2.5 to about 4.5 parts per part of said binder.

8. The paint composition of claim 6 wherein said vinyl resinous binder comprises a polymer of vinylidene chloride.

9. A high solids aqueous paint composition useful in the production of printed surface coverings which comprises a uniform water dispersion of a solid binder comprising a copolymer of vinylidene chloride and vinyl chloride and a plasticizer therefor, and filler, said resinous binder having a stability value of between ¾ and 3 hours, said filler being present in about 1.5 to about 6 parts per part of said binder and the amount of said water being between $x$ and $y+¼y$ wherein $x$ is the weight of said binder and $y$ is the weight of said filler.

10. The paint composition of claim 9 wherein said copolymer contains about 50 to about 75 percent vinylidene chloride by weight.

11. The paint composition of claim 9 wherein said plasticizer is a copolymer of butadiene and styrene.

References Cited in the file of this patent

UNITED STATES PATENTS

| | | |
|---|---|---|
| 835,960 | Leaver | Nov. 13, 1906 |
| 2,023,460 | Beach | Dec. 10, 1935 |
| 2,209,287 | Simpson | July 23, 1940 |
| 2,321,453 | Boileau | June 8, 1943 |
| 2,536,470 | Schoenholz | Jan. 2, 1951 |
| 2,567,678 | Morrison | Sept. 11, 1951 |
| 2,802,799 | Johnson | Aug. 13, 1957 |

OTHER REFERENCES

Payne: "Paint, Oil and Chemical Review," October 22, 1953, pages 14, 16, 18, 20, 22, 42, 44, 45, 46, 48 and 49.